United States Patent [19]

San Giovanni

[11] 4,455,631

[45] Jun. 19, 1984

[54] SEISMIC PARAMETER MEASUREMENT METHOD AND APPARATUS

[75] Inventor: Ronald D. San Giovanni, Burlington, N.J.

[73] Assignee: The United States of America as represented by the Secretary of the Army, Washington, D.C.

[21] Appl. No.: 284,429

[22] Filed: Jul. 20, 1981

[51] Int. Cl.³ .............................................. G01V 1/16
[52] U.S. Cl. .................................. 367/136; 340/566; 340/565; 367/93
[58] Field of Search .............. 367/93, 136, 94, 189, 367/44, 135; 340/566, 541, 565, 554, 546, 563, 651; 330/146

[56] References Cited

U.S. PATENT DOCUMENTS

| | | | |
|---|---|---|---|
| 3,691,549 | 9/1972 | Wilson | 340/566 |
| 3,958,213 | 5/1976 | Scott et al. | 340/566 |
| 3,969,711 | 7/1976 | Ahntholz | 340/651 |

Primary Examiner—Nelson Moskowitz
Assistant Examiner—Ian Lobo
Attorney, Agent, or Firm—Anthony T. Lane; Sheldon Kanars; Jeremiah G. Murray

[57] ABSTRACT

The apparatus comprises a geophone connected to a circuitry case containing a battery, a voltage regulator, a solid state preamplifier and amplifier tuned to respond to seismic signals between 2 and 25 Hz. The amplified seismic signals are rectified and applied to a microammeter connected to efficiently respond to pulsations at the step frequency of walking or crawling personnel. The apparatus can be used to measure seismic noise and to determine soil conditions prior to the emplacement of an intrusion detection system.

7 Claims, 2 Drawing Figures

SEISMIC PARAMETER MEASUREMENT METHOD AND APPARATUS

The invention described herein may be manufactured, used, and licensed by or for the Government for governmental purposes without the payment to me of any royalties thereon.

BACKGROUND OF THE INVENTION

There is currently being developed for the U.S. Army a surveillance system known as the Platoon Early Warning System (PEWS). This system comprises a number of seismic sensors comprising geophones and magnetic detectors which are deployed on the ground around an area to be protected. The sensors are all connected to centralized circuitry via a wire or radio link. The central unit includes seismic frequency amplifiers designed to efficiently amplify seismic signals picked up by the geophones and caused by walking or crawling personnel and to operate an alarm if such signals indicate the presence of intruders. This PEWS system is equipped with an automatic gain control (AGC) system which lowers the seismic amplifier gain in the presence of high amplitude signals. The purpose of this AGC system is to lower the false alarm incidence, however an undesired side effect of the AGC system is to lower the detection range in the presence of large seismic noise signals. Seismic noise may originate from air or vehicular traffic which is picked up by geophones or even wind which results in tree movement. Further, even in the absence of seismic noise, PEWS geophones which are placed in areas of high soil attenuation of the seismic waves of interest, or in areas where the soil-to-geophone coupling is poor, will have limited detection range and will be virtually useless for intended purpose.

The present invention comprises apparatus which can be used to detect the presence of seismic noise of the type described and can also be used to check soil conditions so that the PEWS sensors can be placed where they will be most effective. Also, the apparatus can be used in practicing a novel method for determining the proper spacing of PEWS sensors or geophones so that the coverage of adjacent geophones will be such that there will be no blind spots nor any substantial overlapping coverage of adjacent PEWS geophones. Prior to the present invention, soldiers had no effective means to aid them in the placement of PEWS sensors.

SUMMARY OF THE INVENTION

The apparatus comprises a seismic signal discriminator which comprises a portable, self-contained, battery-powered unit including a geophone on the end of an electronic cable which connects it to the electronic case which contains the seismic amplification and processing circuitry. The circuitry is a battery, a voltage regulator, a band pass preamplifier, seismic filters, a full-wave rectifier, and a microammeter adapted to respond to footstep seismic signals.

The novel method includes the use of this novel apparatus as an aid in emplacing the PEWS sensors in such a way that the PEWS system will have maximum effectiveness and afford maximum protection against intruders.

DETAILED DESCRIPTION OF A PREFERRED EMBODIMENT

Figure 1:
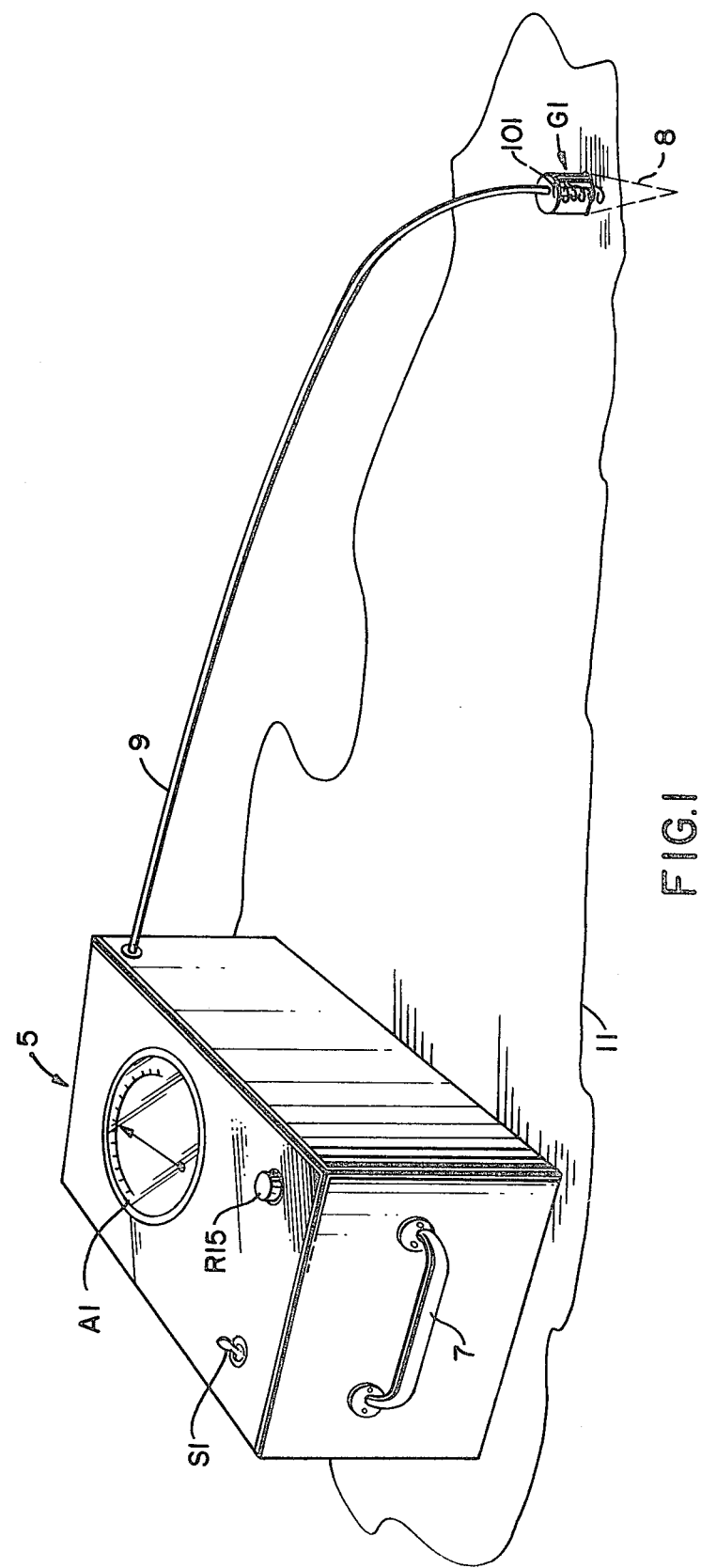
FIG. 1 is a pictorial view of the apparatus.

The pictorial view of FIG. 1 shows the case 5 resting on the ground 11. The case 5 has a microammeter A1, an on-off switch S1 and gain control R15 mounted in its top surface and a handle 7 on one of the vertical sides thereof. The lower portion 8 of the geophone G1 comes to a point to facilitate driving it into the ground, in the manner of a stake. The geophone is of the electrodynamic type including a permanent magnet, a reaction mass, not shown, and a coil 101. Relative movement between the reaction mass and the coil induces voltages in the coil. The coil 101 is connected to the circuitry in case 5 by means of cable 9.

Figure 2:
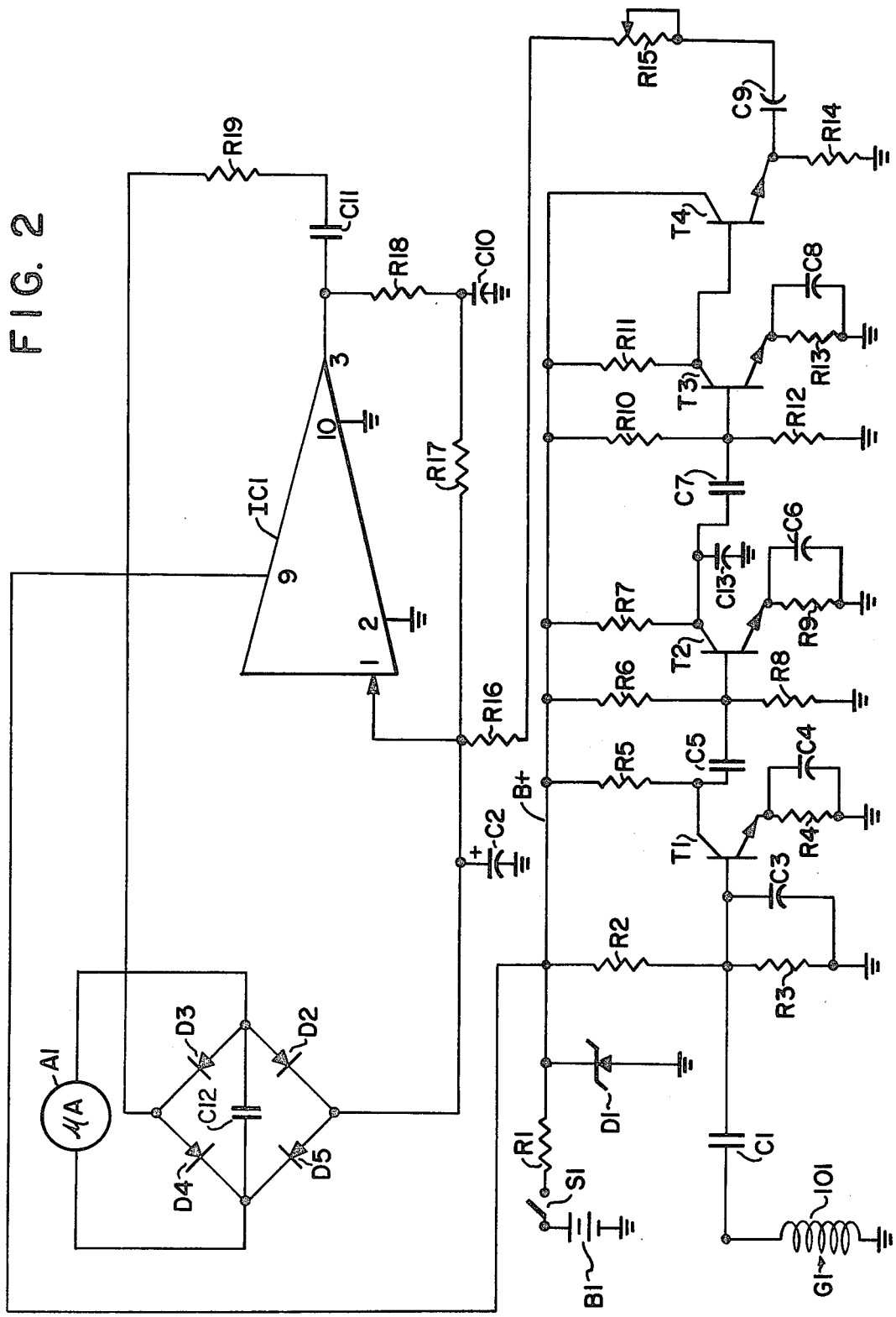
FIG. 2 is a circuit diagram of the apparatus of FIG. 1.

The circuitry within the case 5, as shown in FIG. 2, includes a power source comprising a battery B1 which is connected through on-off switch S1 to resistor R1 and zener diode D1. The resistor R1 and diode D1 together constitute a voltage regulator which provides a relatively constant voltage at the diode anode for application to the solid state circuitry. The three transistors T1, T2 and T3 are connected in cascade to form a bandpass preamplifier for amplifying the seismic signals of interest applied to the base of transistor T1 from geophone coil 101, via coupling capacitor C1. Each of these three transistors, which may be of the type known as 2N2222, obtain base bias from resistive voltage dividers comprising pairs of resistors R2-R3, R6-R8 and R10-R12 connected from the B+ supply line to ground. The collectors of all three of these transistors are connected to the B+ line via collector resistors R5, R7 and R11. Emitter self bias is provided by the paralleled resistor capacitors, R4-C4, R9-C6 and R13-C8. The capacitor C5 couples the signal voltages from the output of T1 to the input of T2 and similarly capacitor C7 couples the output of T2 to the input of T3.

The transistor T4 is a buffer stage connected as an emitter-follower with resistor R14 connected from the emitter to ground and the output voltage taken from the emitter through coupling capacitor C9 and the gain control comprising a rheostat R15.

The seismic amplifier comprises an integrated circuit, IC1, which may bear the commercial designation CA3035. The output of the emitter follower stage is applied to pin 1 of IC1 via resistor R16. Capacitor C2, resistors R15, R16 and R17, and capacitor C10 comprise a low pass filter. As shown, pins 2 and 10 of IC1 are grounded. The output of IC1 is taken from pin 3 and applied to the full wave bridge rectifier comprising diodes D2, D3, D4 and D5, via coupling capacitor C11 and series resistor R19. Negative feedback is provided from the output at pin 3 via resistors R18 and R17 to input pin 1. This negative feedback stabilizes the operation of the seismic amplifier. The diode bridge does not have its low side connected directly to ground as would be the conventional practice, but the low side thereof, namely the junction of diodes D2 and D5, is returned to ground through capacitor C2, with the direct current ground return through IC1 via pins 1 and 3. The dc return through pin 3 includes resistors R17 and R18. This mode of connection means that the seismic signal currents rectified by the diode bridge, after passing through the microammeter A1 are filtered by C2 and C10 and applied to IC1 as dc bias. Pin 9 of IC1 is connected to the B+ line as shown.

The preamplifier and the amplifier comprising IC1 are designed to have a passband of 2 to 25 Hz, which is the frequency range of interest for walking or crawling personnel. The geophone has a resonant frequency of approximately 12 Hz and is undamped, which results in high sensitivity. The emitter R-C circuits of the three transistors, e.g. R4-R4, etc. are designed to provide negative feedback below 2 Hz to define the lower limit of the passband. The aforementioned low pass filter between the buffer and IC1 has a cutoff frequency of 25 Hz to define the upper limit of the passband. The capacitor C13 is connected from the output of T2 to ground and is chosen to short to ground signals below 2 Hz. Further, capacitors C5 and C7 with their respective series resistors R8 and R12 aid in attenuating low frequency signals. The cutoff frequency of the low pass filter previously described can be adjusted somewhat by adjusting gain control R15.

Further, the forward resistance of the diodes of the bridge rectifier are in series with capacitor C2 and thus form an integrator. The time constant of this integrator is selected so that continuous seismic noise signals will be integrated to enhance the sensitivity of the circuit thereto, but the time constant is selected so that seismic signals in the footstep frequency range will not be appreciably integrated and thus meter A1 will pulsate with each step signal received. The microammeter A1 and the filter capacitor C12 are connected across the output diagonal of the diode bridge.

The apparatus described above can be used as a useful tool to aid troops in choosing the proper location for the PEWS sensors described above. The apparatus of FIGS. 1 and 2 can be used to measure the amount of seismic noise, both man made and natural, which would cause overloading and consequent range reduction of the PEWS circuitry as explained above. To measure such seismic noise, the geopone G1 is implanted in the ground area where the PEWS sensors are to be located. Since the circuitry of FIG. 2 has no AGC, any seismic noise picked up will be indicated on meter A1. By reading meter A1, the operator can determine whether the area has a low enough seismic noise level to permit efficient operation of the PEWS system. Assuming that the noise test is favorable, then the apparatus can be used to determine the proper spacing of the PEWS sensors. The PEWS sensors under ideal conditions of soil seismic attenuation and sensor-to-soil coupling have a range of 10 meters and thus under these conditions sensors should be spaced 20 meters apart for maximum perimeter length. Normally the PEWS sensors are arranged around the perimeter of a platoon's area to provide warning of intrusion by hostile troops. The soil attenuation and sensor-to-soil coupling and the resulting range of the PEWS sensors can be estimated quite accurately by means of the following method. The geophone G1 is implanted in an area where it is desired to set up the PEWS system. While one man monitors the reading of microammeter A1, another man starts walking outward from the geophone. The seismic signals due to the footsteps of the walking man will cause the meter A1 to pulsate at the step frequency, and the pulsation will decrease in amplitude as the man's range increases. The amplitude of these pulsations is calibrated in advance for different soil conditions, so that by correlating the pulsation amplitude with a calibration chart, the PEWS sensor spacing can be determined. For example, if the man takes 1 meter paces and after 6 paces, the amplitude of pulsation has declined to a threshold value indicating that the range of the PEWS sensors are 6 meters, the PEWS sensors would then be spaced 12 meters apart. This technique of measuring the step frequency response of a man walking away from the sensor is thus an indirect way of measuring the soil seismic attenuation and soil-to-geophone coupling.

This apparatus and method has been found to be a valuable aid to troops in that it greatly improves their safety by improving the reliability of the PEWS system.

While the invention has been described in connection with illustrative embodiments, obvious variations therein will be apparent to those skilled in the art, accordingly the scope of the invention should be limited only by the appended claims.

I claim:

1. Seismic parameter measurement apparatus, comprising; an electrodynamic geophone comprising a coil and a sharpened portion adapted to be driven into the ground in an area to be tested for the seismic parameters thereof, said coil being connected to an electronic circuitry case by means of an electric cable, said case including a microammeter, an on-off switch and a gain control knob mounted on the top surface thereof, said cable connecting within said case to the input of a solid state bandpass preamplifier comprising three cascaded transistor amplifiers adapted to preamplify seismic signals generated in said coil of sad geophone, said preamplifier comprising a high pass filter, the output of said preamplifier being connected to an emitter-follower circuit adapted to function as a buffer, the output of said emitter follower being applied to an integrated circuit amplifier through a low-pass filter, said integrated circuit amplifier comprising a negative feedback circuit, a diode rectifier bridge circuit connected to the output of said integrated circuit amplifier, said microammeter and a capacitor being connected across the output of said bridge, the ground return circuit of said diode bridge being arranged to provide operating bias voltage for said integrated circuit amplifier, and a battery within said case arranged to provide B+ operating voltage for said preamplifier and integrated circuit amplifier.

2. The apparatus of claim 1 wherein said low pass filter has a cutoff frequency of approximately 25 Hz and wherein said high pass filter has a cutoff frequency of approximately 2 Hz and wherein said geophone is undamped and has a resonant frequency of approximately 12 Hz.

3. A seismic signal discriminator circuit, comprising; an electrodynamic geophone adapted to be driven into the ground in an area where it is desired to measure the seismic parameters of the ground, said geophone comprising a coil, means to connect said coil to a solid state preamplifier designed to amplify seismic signals generated in said coil, means to connect the output of said preamplifier to the input of an integrated circuit which is connected as an amplifier with negative feedback, said preamplifier and amplifier comprising filter means having a passband of approximately 2 Hz to 25 Hz, said geophone being undamped and having a resonant frequency of approximately 12 Hz, a battery power supply for said preamplifier and amplifier and a zener diode voltage regulator connected to said battery, seismic signals at the output of said amplifier being applied to a bridge type rectifier comprising four diodes, and a microammeter connected to the output of said rectifier.

4. Apparatus designed to measure the seismic parameters of the ground in a given area, comprising; an electrodynamic geophone implanted in the ground in said area, the coil of said geophone being connected to a solid state preamplifier and amplifier connected in cascade and tuned to amplify seismic signals from 2 to 25 Hz, said geophone being undamped and having a resonant frequency between 2 and 25 Hz, the output of said amplifier being rectified by means of a bridge circuit comprising four diodes, and the rectified seismic signals being applied to a microammeter, the ground return circuit of said microammeter including a capacitor which functions as part of an integrator in conjunction with the forward resistance of said diodes, the time constant of said integrator being chosen to permit said microammeter to respond to step frequency seismic signals without appreciable integration and to integrate higher frequency seismic signals.

5. A method of determining the optimum placement of an array of geophones to surround an area to be protected from intruders on foot comprising the steps of: implanting an electrodynamic test geophone in the ground in said area to be protected, said geophone being undamped and the coil of said geophone being connected to a solid state preamplifier and amplifier connected in cascade; amplifying the seismic signals; rectifying the signals by means of a bridge circuit comprising four diodes; displaying the seismic signals on a microammeter, the ground return circuit of which includes a capacitor which functions as part of an integrator in conjunction with the forward resistance of said diodes, the time constant of said integrator being chosen to permit said microammeter to respond to step frequency signals without appreciable integration, to determine the presence of seismic noise in the area; if said seismic noise is below a predetermined value, determining the proper spacing of said geophones in said array of geophones by generating seismic signals at various distances from said test geophone; and, coordinating the readings on said microammeter with the positions of the signal generator.

6. The method of determining placement of an array of geophones of claim 5 further comprising the steps of; measuring the amount of seismic noise in the area to be protected by said array of geophones before implanting same; implanting said geophones; and, then measuring the soil attenuation and geophone-to-soil coupling.

7. The method as in claim 5 of determining the proper spacing of an array of geophones intended to pick up seismic waves produced by intruders on foot, comprising the further steps of; generating a signal outward from said geophone; determining at what distance from said geophone the seismic signals fall below a threshold value below which they are not detectable; and spacing said geophones in an array of geophones at twice and determined distance.

* * * * *